Aug. 7, 1962 R. BECKNELL 3,048,248
FRICTION CLUTCHES
Filed June 19, 1958

INVENTOR.
RALEIGH BECKNELL
BY
Joseph A. Rave
Attorney

Aug. 7, 1962 R. BECKNELL 3,048,248
FRICTION CLUTCHES
Filed June 19, 1958 2 Sheets-Sheet 2

INVENTOR.
RALEIGH BECKNELL
BY Joseph A. Rave
Attorney

United States Patent Office 3,048,248
Patented Aug. 7, 1962

3,048,248
FRICTION CLUTCHES
Raleigh Becknell, Cincinnati, Ohio, assignor to The Conway Clutch Company, Cincinnati, Ohio, a corporation of Ohio
Filed June 19, 1958, Ser. No. 743,202
3 Claims. (Cl. 192—85)

This invention relates to improvements in friction clutches and particularly to the operating mechanism of such clutches.

Friction clutches of the friction disc type are well known but in the past have been operated either through mechanical means, which is movable relative to the supporting shaft, or through fluid means, such as compressed air, under the control of a valve mechanism. In the past the fluid means, particularly compressed air, operated clutches had the source of the air connected to an aperture axially of the shaft and therefore required a rotating seal to prevent loss of pressure. This construction was frequently costly to maintain and at the same time required extreme care in building and operating it.

By the present invention the heretofore difficulties involved in a fluid means, particularly compressed air, actuated clutch have been eliminated.

It is, therefore, the principal object of the present invention to provide a clutch of the friction disc type which is operated by a fluid medium and whose construction has been materially simplified.

Another object of this invention is the provision of a fluid medium operated clutch that is substantially leak proof due to the fact that no rotating seal is necessary in conveying the said fluid medium.

It is also an object of this invention to provide a friction disc clutch wherein the thrust for effecting the friction connection of the friction discs is effected through roller bearings thereby materially increasing the life of the parts by materially reducing friction wear.

It is a further and specific object of the present invention to provide a fluid actuated friction disc clutch that is economical to produce, acquire and maintain.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings.

Throughout the several views of the drawings similar reference characters are employed to denote the same or similar parts.

Figures 1, 2:
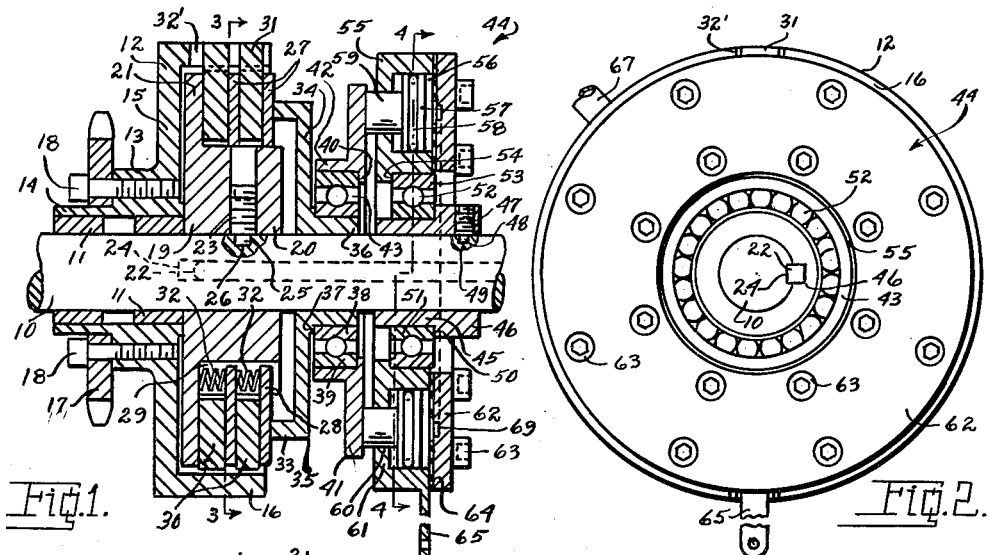
FIG. 1 is a vertical sectional view through a friction disc clutch of the present invention as more particularly seen from line 1—1 on FIG. 3.
FIG. 2 is an end elevational view of the friction disc clutch of FIG. 1, as seen from the right hand end thereof in FIG. 1.

As will be obvious from the above two forms of a friction disc clutch, each embodying the principles of the present invention, are illustrated in the drawings and will be independently described in so far as their structure differs from one another.

The form of the clutch illustrated in FIGS. 1 to 5, inclusive, is illustrated in connection with a shaft 10 which is to be driven through the clutch of the present invention and which shaft 10 has freely mounted thereon through bushings or bearing sleeves 11 the driving clutch member 12. The clutch member 12 is substantially cup shaped and includes a sleeve 13 having a reduced portion 14 at one end thereof and a radial flange 15 at its other. The radial flange 15 at its periphery is provided with a cup shaped receptacle or flange 16 within which is disposed the clutch discs as will presently be made clear.

Mounted on the reduced portion 14 of the sleeve 13 is the motion or power receiving member, disclosed in the drawings as a sprocket 17. The sprocket 17 is secured to the sleeve 13 and therefore the driving clutch member 12 through a plurality of cap screws 18.

Disposed within the driving clutch member cup flange 16 is a driven clutch member indicated in its entirety by the reference numeral 19. The driven clutch member 19 includes a central hub portion 20 from inner end of which radially projects a flange 21 which forms the main thrust member for the friction discs. The driven clutch member 20 is secured in any suitable manner to the shaft 10 as by a key 22 and by a dog screw 23. The key 22, as seen particularly in FIG. 3, is disposed in a keyway 24 formed into the shaft 10 while the dog screw 23 has a projecting nose 25 disposed in a socket 26 likewise formed in the shaft 10.

Disposed on the periphery the hub 20 is one or more discs 27, there being two such discs disclosed in FIG. 1. The said discs 27 are formed to a diameter equal, substantially, to that of the driven clutch member flange and thrust element 21 and each of said discs 27 has projecting inwardly of its bore one or more ears 28, there being two such ears illustrated in the drawings and at diametrically opposite points.

Figures 3, 4:
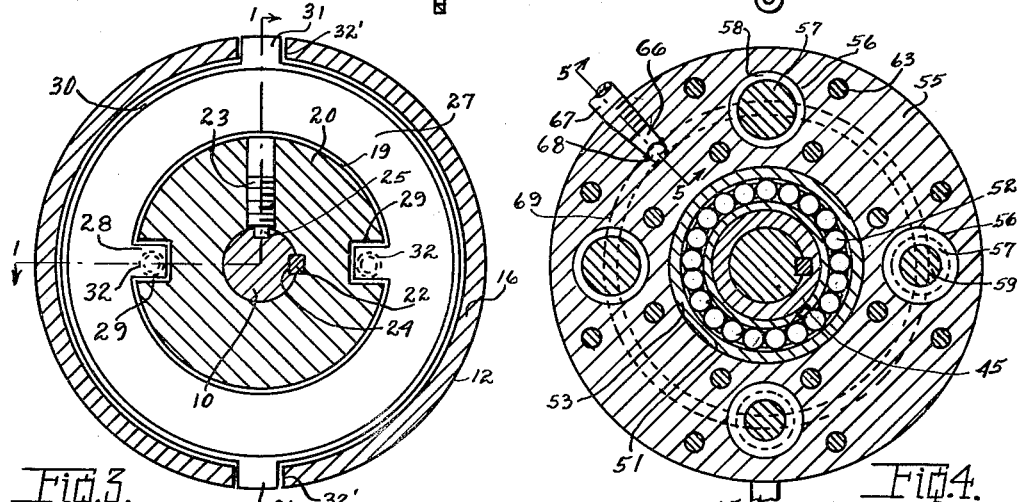
FIG. 3 is a transverse sectional view through the clutch as seen from line 3—3 on FIG. 1.
FIG. 4 is a transverse sectional view through the clutch, similar to FIG. 3, taken through a plane to the right of said FIG. 3 on line 4—4 on FIG. 1.

The ears of the discs are in alignment with one another and disposed in a socket 29 formed in the hub 20 inwardly of its diameter, see FIG. 3, there being as many sockets or keyways 29 as there are disc ears 28.

The said driven clutch discs 27 are spaced from one another, and the inner of said friction disc 27 is likewise spaced from the driven clutch member flange 21 by a driving clutch discs 30. Said driving clutch discs 30, in the main, have a diameter slightly less than the interior diameeter of the driving clutch member cup flange 16 and each of said driving clutch member discs 30 is provided outwardly of its periphery with one or more ears 31, there being two such ears illustrated in the drawings at diametrically opposite points, and the same are in alignment with one another. The driving clutch disc ears 31 are disposed in slots 32 formed inwardly of the free end of the driving clutch member cup flange 16.

From the foregoing it will be noted that the driving clutch discs 30 are connected with the driving clutch member 12 through outwardly radially projecting ears 31 while the driven clutch discs 27 are connected with the driven clutch member 19 through inwardly radially projecting ears 28.

The said clutch discs or plates 27 and 30 are adapted to be free of one another except when motion is desired to be given to the shaft 10, and to effect such freeing of the clutch discs the inwardly projecting ears or lugs 28 of the driven clutch discs 27 has interposed between them an expansion spring 32 with a similar expansion spring 32 being interposed between the inner driven clutch disc 27 and the driven clutch member flange 21 all as clearly illustrated in FIG. 1.

The outer clutch disc 27 has contacting its outer surface the free edge of a cup-like flange 33 at the outer end of a disc 34 of the clutch shifter member 35. The said clutch shifter member 35 has substantially central and axially thereof a sleeve 36 freely mounted on the shaft 10. The sleeve 36 of the clutch shifter element 35 is provided with a shoulder 37 against which the inner race 38 of a ball bearing engages, with said ball bearing having its outer race 39 against a shoulder or flange 40 formed on a shifter element 41. The shoulder or flange 40 of the shifter element 41 is in reality the base of a counter bore which is provided with a short sleeve 42 in which is disposed the outer ball bearing race 39.

It should be here noted that the friction disc shifter comprises the element indicated in its entirety by the reference numeral 35, the shifter element indicated in its entirety by the reference numeral 41 and the ball bearing indicated in its entirety by the reference number 43 and comprising the inner and outer races 38 and 39 together with their interposed ball bearings.

The clutch disc shifter-actuator is located at the right of the shifter and is indicated in its entirety by the reference numeral 44 and comprises a locating sleeve 45 having at its outer end, integral therewith, a collar 46 through which projects a dog screw 47. The dog screw 47 is provided with a nose or projection 48 received in a socket 49 formed in the shaft 10.

The sleeve collar 46 provides on its inner end a shoulder 50 against which one face of an anti-friction ball bearing inner race 51 abuts. The ball bearing, indicated in its entirety by the reference numeral 52, has its outer race 53 disposed in a counterbore and against a shoulder 54 of a cylinder ring or housing 55. As seen in FIG. 4 the cylinder ring 55 is provided with a plurality of piston cylinders or chambers 56, there being four such cylinders or chambers illustrated. Disposed in each cylinder 56 is a piston 57 each provided with a piston ring which may conveniently take the form of a well known O-ring 58. The said O-ring 58 frictionally hugs the cylinder wall to provide a leak proof joint around each piston 57. As seen in FIG. 1 each piston 57 has projecting from it a piston rod 59 each of which passes through a suitable aperture 60 in the base 61 of the cylinder ring 55 and with each piston rod 59 having its outer end in face contact with shifter member radial flange 41.

The piston cylinders are formed in the cylinder ring or housing 55 through one face thereof and the open end of said cylinders are closed by a cylinder cap ring 62 which is secured in position by cap screws 63 passing through said cylinder cap ring into suitable threaded sockets formed in the cylinder ring 55 in the areas between the piston cylinders or chambers 56. To insure a leak proof connection between the cylinder ring and its cap ring a suitable gasket 64 is interposed.

In practice the cylinder ring 55 is maintained stationary and which may be effected in any suitable or desirable manner, such as by bracket arm 65 which may be attached to a stationary part of the device, not shown, with which the clutch is employed.

Figures 5, 6:
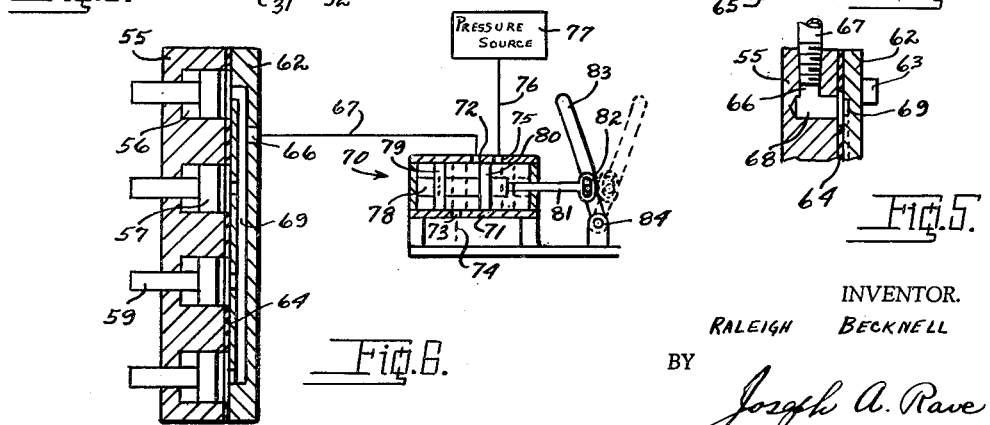
FIG. 5 is a fragmentary sectional view through a portion of the clutch as seen from line 5—5 on FIG. 4 and illustrating a detail in the construction.
FIG. 6 is a diagrammatic view illustrating the fluid circuit and its control valve for operating the clutch of the present invention.

The cylinder ring, see FIGS. 4 and 5, is provided with a radial port 66 with one end of which is connected a pipe or conduit 67 extending from a compressed air source, preferably, as will presently be made clear, from a control valve. The radial compressed air port 66 connects at its other end with an angular port 68 which breaks through the face of the cylinder ring 55 and connects with a circular port or passageway 69 formed in the inner face of the cap ring 62. As illustrated in FIGS. 1 and 4, the cap ring port or passageway 69 connects each of the piston cylinders 56 wherefore any compressed air delivered to the radial port 66 finds its way through the angular 68 and circular port or passage 69 to each of the cylinders 56 for simultaneously actuating the pistons 57 therein.

Any suitable or desirable means may be employed for connecting a pressure source with the cylinders 56 and their pistons 57, such means, as diagrammatically illustrated in FIG. 6, may take the form of a manually operated valve indicated in its entirety by the reference numeral 70. The illustration of the valve 70 is diagrammatic and comprises a sleeve 71 closed at its opposite ends and provided with a plurality of ports including port 72 with which the other end of the pipe or conduit 67 connects, said pipe or conduit 67 having its other end, as pointed out above, connected with the radial port 66 of the cylinder ring 55. A second port 73 in the valve sleeve 71 is connected to atmosphere as indicated at 74 while a further port 75 in the valve sleeve 71 has connected therewith one end of a pipe or conduit 76 whose other end is connected with a suitable pressure source 77.

Disposed within the valve sleeve 71 is a spool type valve 78 having formed thereon lands 79 and 80 forming between them a connecting passageway for alternately connecting the pipe or conduit 67 with the atmosphere 74 and the pressure source 77. The position of the valve spool 78, illustrated in full lines in FIG. 6, connects the said pipe or conduit 67 from the cylinder ring with the atmosphere 74 wherefore the springs 32 have separated the clutch discs 30 and 27 so that no motion is being transmitted through the clutch. The second position of the valve spool 78 is illustrated in dotted lines in FIG. 6, and at which time the pipe or conduit 67 from the cylinder ring 55 would be connected with the pipe or conduit 76 from the pressure source 77 for actuating the pistons 57 to the left as seen in FIG. 1 and for establishing a friction driving connection between the discs 27 and 30 and between the shifter mechanism flange 33 and driven clutch member radial flange 21.

In order to shift the valve spool 78 it has projecting therefrom a rod 81 having at its outer end a pivotal connection 82 with a lever 83 which in turn is pivotly connected at 84 to a suitably supporting bracket.

From the foregoing it will be noted that air pressure in the several cylinders 56 simultaneously actuate the pistons 77 therein for actuating or shifting the friction disc shifter mechanism and which shifter mechanism, as noted above, transfers the shifting and driving pressure through the ball bearing 43. By this construction the shifter element 35 along with the driving and driven clutch members are rotated in transmitting motion and power from the sprocket 17 to the shaft 10 while the shifter element 41 and the cylinder ring 55 along with the pistons and closing cap ring 62 are maintained stationary. At the same time the locating and securing sleeve for the actuator 44 rotates with shaft 10 on the ball bearing 52.

From this it follows that the clutch shifting fluid pressure means remains stationary during the operation of the clutch and requires no rotating seal of any sort or at any point to prevent loss of fluid pressure during the operation of the clutch.

The modified form of clutch disclosed in FIGS. 7 to 10, inclusive, utilizes but a single piston and may be termed a self contained clutch since the shifter mechanism and actuator therefor are each carried by the driven clutch member instead of having a part of the actuator secured to the shaft independently of said driven clutch member.

Specifically the said modified clutch comprises a driving clutch member 12′ including a sleeve 13 through which it is mounted on the shaft 10 through bushings or bearing sleeves 11. The sleeve 13 may have secured to it a sprocket similar to that illustrated in FIG. 1 or may have secured to it any other suitable or desirable driving member. The driving clutch member 12′ includes a radial flange 15 from the inner end of the sleeve 13 and which radial flange 15 has at its outer periphery the cup flange 16′.

Disposed within the cup flange 16′ is the clutch driven member 19′ which includes at its one end a radial flange 21 and at its other end a sleeve 85. The driven clutch member 19′ and its sleeve 85 are secured to the shaft 10 by means of a key 22 as well as by a dog screw 86.

Figure 7:
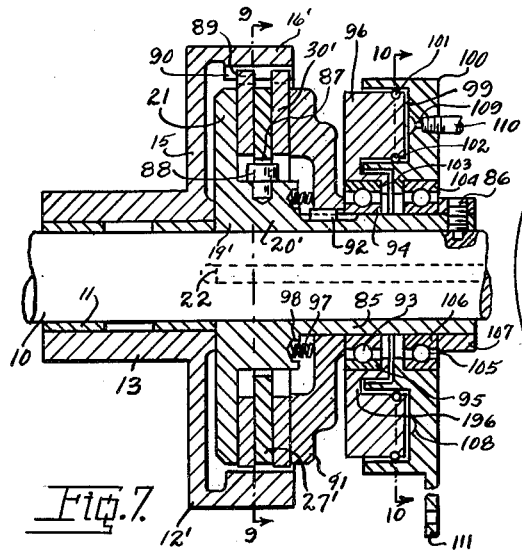
FIG. 7 is a longitudinal sectional view, similar to FIG. 1 of a friction disc clutch disclosing modifications in the clutch construction as seen more particularly from line 7—7 on FIG. 9.
Figure 8:
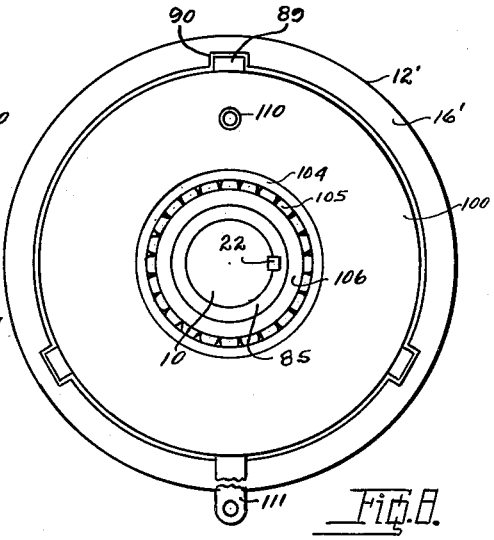
FIG. 8 is an end elevational view of the modified clutch as seen from the right hand end thereof in FIG. 7.
Figure 9:
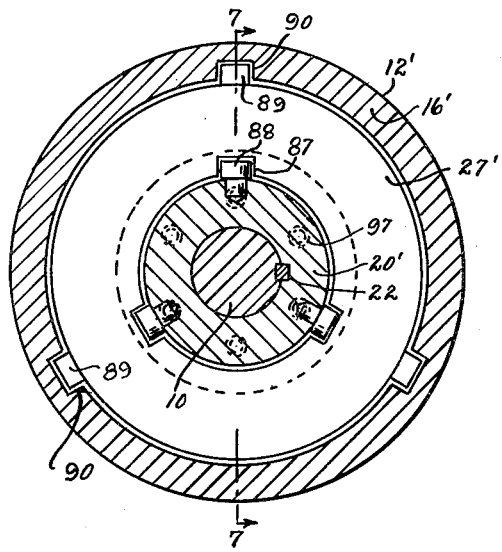
FIG. 9 is a transverse sectional view through the clutch of FIG. 7 as seen from line 9—9 on said FIG. 7.
Figure 10:
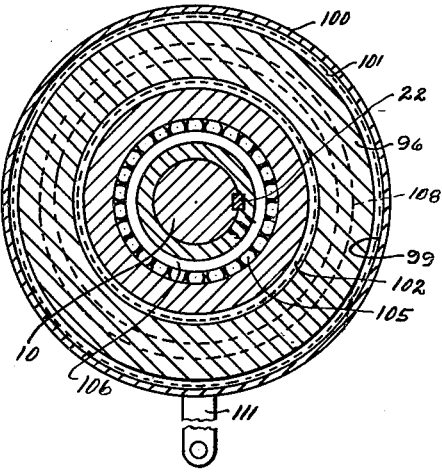
FIG. 10 is a transverse sectional view, similar to FIG. 9, of the modified clutch taken through a plane to the right of that of FIG. 9 on line 10—10 on FIG. 7.

Disposed on the central hub or body portion 20′ of the driven clutch member 19′ is a friction disc 27′ which instead of having ears or lugs inwardly projecting from its bore is, instead, provided with a plurality of outwardly radiating keyways or passages 87 which, as seen in FIGS. 7 and 9, straddle a pin 88 which may be called connecting keys, upwardly upstanding from the said body portion or hub 20′. Any suitable or desirable number of keys 88 may be employed with the friction disc 27′ having a corresponding number of keyways or passageways 87, there being three such mechanisms disclosed in FIG. 9. A driving friction disc 30′ is mounted on each side of the driven friction disc 27′ and which disc each has projecting from its periphery, at spaced points thereon, a lug or ear 89 which are disposed in keyways or passageways 90 formed inwardly of the inner surface of the cup flange 16′.

The friction discs 27′ and 30′ are adapted to be pressed into driving engagement with one another and with the driven clutch member flange 21 through a shifter plate 91 which is mounted on the sleeve 85 of the driven clutch member 19′, with said shifter plate 91 being keyed at 92 for rotative movement with the said driven clutch member as well as for independently sliding movement thereon.

Mounted on the driven clutch member sleeve 85 is a ball bearing 93 having its inner race 94 in face contact with the plate 91 and with said ball bearing 93 having its outer race 95 disposed in a counter-bore in the shifter actuating member 96 and which actuating member 96 is actually a fluid actuated piston.

The friction discs 27′ and 30′ are normally maintained in non-driving connection by means of springs 97 located respectively in a socket 98 in the face of the driven clutch member body portion 20′ and with said springs having their other ends in abutment with the inner face of the shifter plate 91.

As noted above the actuator 96 is a single piston in the form of a ring having a radial web 196 at its inner end and with said piston 96 disposed in a cylinder 99, in the form of a channel formed inwardly of the inner end of cylinder plate or housing 100. To prevent leakage past the piston 96 it is provided on its outer periphery with a piston ring 101 in the form of the well known O-ring and is further provided on its inner periphery with a second piston ring 102, again, in the form of an O-ring.

The cylinder ring or piston housing 100 is provided inwardly of its outer face with a counter-bore having a base or shoulder 103 at its inner end for engagement with the outer race 104 of an anti-friction ball bearing 105. The inner race 106 of the ball bearing 105 is disposed on the driven clutch member sleeve 85 and placed under proper tension by a collar 107 on the outer end of the sleeve 85 and secured in operative position by the dog screw 86.

Formed in the bottom of the channel or cylinder 99 and circumferentially of its axis is a groove or passageway 108 with which communicates a port 109 extending through the cylinder plate or housing 100 in a direction axially thereof. The port 109 has connected therewith one end of a pipe or conduit 110 which is similar in all respects to the pipe or conduit 67, above referred to, and which pipe or conduit 110 extends from a suitable control valve, such as the valve diagrammatically illustrated in FIG. 6.

The operation of the modified clutch in FIGS. 7 to 10, inclusive, is believed obvious since connection of a fluid medium under pressure by way of the pipe or conduit 110 acting on the inner face of the piston-actuator 96 forces said piston-actuator to the left in FIG. 7 and correspondingly shifts the ball bearing 93 for actuating the shifter plate 91 against the friction discs 30′ and 27′ and against the driven clutch member radial flange 21. This sets up a friction drive between said friction discs 27′ and 30′ which through their connecting keys and lugs with the driven and driving clutch members effects a unitary drive through the clutch.

At the same time the piston-actuator 96 and the cylinder plate 100 may, again, be secured against rotation through the arm 111. The said cylinder plate 100 permitting the driving clutch member sleeve 85 to rotate relative thereto through the ball bearing 105.

From the foregoing it will now be appreciated that there has been provided a friction disc clutch that accomplishes the objects initially set forth.

What is claimed is:

1. In a friction disc clutch for transmitting motion between a prime mover and a shaft, the combination with said shaft, of a driving clutch member rotatably mounted on said shaft and including a cup-like receptacle, a driven clutch member within the driving clutch member cup-like receptacle with said driven clutch member including a body portion and a thrust flange at one end of the body portion, a separate friction clutch disc respectively connected with the driving clutch member and the driven clutch member, said friction clutch discs being adapted to be actuated relative to one another and shifted into engagement with one another and the driven clutch member thrust flange, a clutch disc shifter member secured to one of said shaft and driven clutch member for rotation therewith but independent axial movement relative thereto, said shifter member including a body portion with means projecting from one side thereof into frictional contact with said friction discs and said shifter member body portion having a sleeve projecting from its other side, an actuator including a sleeve concentric with and outwardly spaced from the shifter member sleeve, an anti-friction ball bearing between said shifter member and actuator concentric sleeves with the inner race of said ball bearing secured to the shifter member sleeve and the outer race of said ball bearing secured to the actuator sleeve, and pressure medium actuated means connected with the actuator for actuating the same and shifting the clutch discs into engagement with one another and the driven clutch member thrust flange, comprising a plurality of piston rods equally spaced circumferentially of the actuator, a piston carried by each piston rod, a pistons cylinder housing in the form of a ring having a body portion between an external diameter and a concentric central aperture and said body portion having parallel side faces, a piston cavity for each piston formed in the body portion through one side face toward the other side face but stopping short of said other side face to form a base for each piston cavity, each piston cavity having a bore from its base through the piston cylinder housing other side face and through which bore projects the piston's rod, said piston cavities being located, radially of the pistons cylinder housing, between the housing external diameter and central aperture, means closing the piston cavities after the insertion therein of the pistons, and means securing said pistons cylinder housing concentric with and relative to the shaft in such manner that the said cylinder housing is held against rotation and axial movement with respect to the shaft.

2. In a friction disc clutch for transmitting motion between a prime mover and a shaft, the combination with said shaft, of a driving clutch member rotatably mounted on said shaft and including a cup-like receptacle, a driven clutch member within the driving clutch member cup-like receptacle with said driven clutch member including a body portion and a thrust flange at one end of the body portion, a separate friction clutch disc respectively connected with the driving clutch member and the driven clutch member, said friction clutch discs being adapted to be actuated relative to one another and shifted into engagement with one another and the driven clutch member thrust flange, a clutch disc shifter member secured to one of said shaft and driven clutch member for rotation therewith but independent axial movement relative thereto, said shifter member including a body portion with means projecting from one side thereof into frictional contact with said friction discs and said shifter member body portion having a sleeve projecting from its other side, an actuator including a sleeve concentric with and outwardly spaced from the shifter member sleeve, an anti-friction ball bearing between said shifter member and actuator concentric sleeves with the inner race of said ball bearing secured to the shifter member sleeve and the outer race of said ball bearing secured to the actuator sleeve, pressure medium actuated means connected with the actuator for actuating the same and shifting the clutch discs into engagement with one another and the driven clutch member thrust flange, comprising a plurality of piston rods equally spaced circumferentially of the actuator, a piston carried by each piston rod, a pistons cylinder housing in the form of a ring having a body portion between an external diameter and a concentric central aperture and said body portion having parallel side faces, a piston cavity for each piston formed in the body portion through one side face toward the other side face but stopping short of said other side face to form a base for each piston cavity, each piston cavity having a bore from its base through the piston cylinder housing other side face and through which bore projects the piston's rod, said piston cavities being located, radially of the pistons cylinder housing, between the housing external diameter and central aperture, means closing the piston cavities after the insertion therein of the pistons, and means securing said pistons cylinder housing concentric with and relative to the shaft in such manner that the said cylinder housing is held against rotation and axial movement with respect to the shaft including a ball bearing between the cylinder housing and shaft with the outer race of said ball bearing secured to the cylinder housing and the inner race of said ball bearing secured to the shaft for rotation therewith.

3. In a friction disc clutch for transmitting motion between a prime mover and a shaft, the combination with said shaft, of a driving clutch member rotatably mounted on said shaft and including a cup-like receptacle, a driven clutch member within the driving clutch member cuplike receptacle with said driven clutch member including a body portion and a thrust flange at one end of the body portion, a separate friction clutch disc respectively connected with the driving clutch member and the driven clutch member, said friction clutch discs being adapted to be actuated relative to one another and shifted into engagement with one another and the driven clutch member thrust flange, a clutch disc shifter member secured to one of said shaft and driven clutch member for rotation therewith but independent axial movement relative thereto, said shifter member including a body portion with means projecting from one side thereof into frictional contact with said friction discs and said shifter member body portion having a sleeve projecting from its other side, an actuator including a sleeve concentric with and outwardly spaced from the shifter member sleeve, an anti-friction ball bearing between said shifter member and actuator concentric sleeves with the inner race of said ball bearing secured to the shifter member sleeve and the outer race of said ball bearing secured to the actuator sleeve, pressure medium actuated means connected with the actuator for actuating the same and shifting the clutch plates into engagement with one another and the driven clutch member thrust flange, comprising a plurality of piston rods equally spaced circumferentially of the actuator, a piston carried by each piston rod, a pistons cylinder housing in the form of a ring having a body portion between an external diameter and a concentric central counter-bored aperture and said body portion having parallel side faces, a piston cavity for each piston formed in the body portion through one side face toward the other side face thereof but stopping short of said other side face to form a base for each piston cavity, each piston cavity having a bore from its base through the piston cylinder housing other side face and through which bore projects the piston's rod, said piston cavities being located, radially of the piston cylinder housing, between the housing external diameter and central counter-bored aperture, a closure plate carried by the first side face of the body portion for closing the piston cavities after the insertion therein of the pistons, and means securing said pistons cylinder housing concentric with and relative to the shaft in such manner that the said cylinder housing is held against rotation and axial movement with respect to the shaft including a pistons cylinder housing supporting sleeve on the shaft concentric with the cylinder housing but inwardly spaced therefrom with said sleeve having an outward radial flange at one end thereof, said piston cylinder housing central counter-bored aperture providing an inward radial flange in opposition to the outward radial flange of the supporting sleeve, and an anti-friction ball bearing between the cylinder housing central aperture and the shaft supporting sleeve with the outer race of said ball bearing secured to the cylinder housing against its shoulder and with the inner race of said ball bearing secured to the shaft sleeve against its shoulder.

References Cited in the file of this patent

UNITED STATES PATENTS

| | | |
|---|---|---|
| 1,864,126 | Ferris | June 21, 1932 |
| 2,211,781 | Joy et al. | Aug. 20, 1940 |
| 2,342,880 | Masek | Feb. 29, 1944 |
| 2,587,230 | Schaad | Feb. 26, 1952 |
| 2,701,042 | Kurzweil | Feb. 1, 1955 |
| 2,806,567 | Bonquet | Sept. 17, 1957 |
| 2,868,027 | Oberholtz et al. | Jan. 13, 1959 |

FOREIGN PATENTS

| | | |
|---|---|---|
| 927,346 | France | Apr. 28, 1947 |
| 130,830 | Sweden | Feb. 13, 1951 |